United States Patent Office 3,580,748
Patented May 25, 1971

3,580,748
WELDING FLUX COMPONENT
William T. Delong, Manchester Township, York County, Pa., assignor to The McKay Company, Pittsburgh, Pa.
No Drawing. Filed July 12, 1968, Ser. No. 744,317
Int. Cl. B23k 35/36
U.S. Cl. 148—26          24 Claims

ABSTRACT OF THE DISCLOSURE

A welding flux component comprising a fused mixture consisting essentially of the following listed constituents in the specified weight percentages: about 40% to about 90% of at least one stabilizing compound selected from the group consisting of fluorides, silicofluorides and fluoaluminates and about 10% to 60% of basic oxide. The flux component may also contain acidic oxide and neutral oxide, the fused mixture having a base-to-acid mole ratio of at least 2 to 1. Preferred stabilizing compounds include manganese fluoride, aluminum fluoride, potassium silicofluoride, sodium silicofluoride, lithium silicofluoride, potassium fluoaluminate, sodium fluoaluminate and lithium fluoaluminate. Preferred welding flux components have a base-to-acid mole ratio of at least 3 to 1.

---

This invention relates to welding flux components comprising fused mixtures for welding fluxes of the types used in submerged arc welding, covered electrode coatings and flux-cored or low flux tubular electrodes employed with or without gas shielding. My welding flux component can be employed in a welding flux used in any method of joining or welding or surfacing that may require the use of a flux such as a flux entrained in a gas stream or a flux painted on. However, for purposes of explanation and illustration I shall describe my welding flux component in connection with its utilization in submerged arc welding fluxes, covered electrode coatings and flux-cored tubular electrode fluxes.

It is well known that the alkali metal oxides and alkaline earth metal oxides can be used to accomplish useful results in welding fluxes. Examples of alkali metal oxides are lithium oxide, sodium oxide and potassium oxide. Examples of alkaline earth metal oxides are magnesium oxide, calcium oxide and strontium oxide. These oxides act as arc stabilizers in arc welding such as with manual covered electrodes or with flux-cored tubular electrodes. These oxides also act as slag formers and fluxing agents in combination with other ingredients that may be present in the welding flux as used in the submerged arc, covered electrode or tubular electrode welding processes. Welding slags perform a fluxing or purifying process on the molten weld metal and thereby remove or reduce undesirable impurities such as oxygen and sulfur. This fluxing action is more effective when the slag is basic due to the presence of alkali metal oxides and alkaline earth metal oxides. Furthermore, the slags perform a protective function by protecting the molten metal in the arc or in the weld pool from the harmful effects of the nitrogen, oxygen or other harmful gases that can be present during welding. The basic oxides also affect the melting range of the welding flux and can be added in appropriate percentages to vary the melting range as desired.

Although both classes of oxides, i.e., alkali metal oxides and alkaline earth metal oxides, can be used to perform the desirable functions described above, thhe alkali metal oxides are much preferred, in part because of their much greater basicity. They are preferred as arc stabilizers, fluxing agents and protective agents. I have found that a useful measure of the basicity of a flux or a fused material is the base-to-acid mole ratio calculated by dividing the number of moles of basic oxides by the number of moles of acidic oxides that are present.

It has heretofore been proposed to introduce the alkali metal oxides and alkaline earth metal oxides into the welding fluxes in several different forms. The forms which have been available in the prior art include oxides, hydroxides, carbonates, titanates, zirconates, silicates, aluminates and various fused mixtures or frits. Each of these heretofore available forms possessed one or more limitations which resulted in major problems when it was used as a welding flux component. A number of these limitations are described in the following paragraphs.

A very critical limitation is the presence of hydrogen or hydrogen compounds in the flux. The absorption of hydrogen by the molten weld metal from the flux can lead to subsequent weld porosity and weld cracking. It is well known that the amount of hydrogen that can be tolerated depends, among other factors, on the composition of the weld metal, the composition of the material being welded and the criticality of the weld. Based on these factors, the amount of hydrogen that can be present in the welding flux for use with a particular welding process is established. Sources of such hydrogen include hydrogenous materials such as cellulose and, of particular concern, water. Thus, for example, in low-hydrogen covered electrodes little if any hydrogenous material is used and the amount of water in the coating is maintained at a low level. Not only the initial moisture content but also the rate at which the flux picks up moisture from its surroundings is important. This rate of rehydration should be kept low. Higher moisture contents and rehydration rates can be tolerated in fluxes for less stringent applications. Unfortunately the most efficient sources of alkali metal oxide and alkaline earth metal oxides are the oxides themselves and the hydroxides but these bring the most severe hydrogen problems to a welding flux for the hydroxides being hydrated oxides contain water and both the oxides and hydroxides abstract it from the atmosphere at varying rates.

In fluxes for submerged arc welding and for tubular electrodes substantial quantities of ingredients that break down during welding and generate large amounts of carbon dioxides or carbon monoxide are generally undesirable. It is well known that the generation of excessive amounts of such gases will produce poor welding operation. The welding arc will be unstable and the resulting bead can have undesirable features such as gas holes, rough contour or irregular shape. Carbon dioxide and carbon monoxide can be chemically reduced thus increasing the carbon content of the weld or they may act to oxidize valuable alloying elements. Therefore sources of alkali metal oxide and alkaline earth metal oxide which also liberate gases in welding must be severely limited in a welding flux.

The remaining available sources of alkali metal oxide and alkaline earth metal oxide have been fused mixtures or frits and such natural or manufactured sources as the titanates, zirconates, silicates and aluminates. As sources for building up the alkali metal oxide and alkaline earth metal oxide content of a welding flux these are either weak and inefficient sources of the basic oxides, particularly the alkali metal oxides, or they are coupled with a high content of acidic or other (neutral) oxide or they are hygroscopic. In order to introduce a desired basic oxide into a flux using one of the above mentioned sources it has been necessary also to accept the accompanying acidic or other (neutral) oxides. The amount of these which can be accommodated in a given flux is always limited and in some welding systems they may be highly undesirable. For example, it is well known that the presence of silica in the welding flux can increase the silicon content of the weld metal which is not desirable in some applications. If, in order to improve the efficiency, the basic oxide content is raised in the above mentioned sources they tend to become hygroscopic and easily hydrated and their general stability toward water becomes unacceptable for welding purposes.

Another limitation of some sources of alkali metal oxide and alkaline earth metal oxide, particularly the natural minerals, is that they can introduce into the welding flux unwanted elements or their compounds. Sulfur, phosphorus, boron, arsenic and other unwanted elements must be carefully controlled in welding fluxes to prevent bad metallurgical results.

The prior art has not had available and there is an urgent technical need for a welding flux component which in the first place is high in the desired alkali metal oxide and alkaline earth metal oxide content and low in acidic and other (neutral) oxides and which secondly does not introduce unacceptable problems of water content, hygroscopic behavior, gas evolution and impurity levels.

Examples of materials that have been available as sources of alkali metal oxides and alkaline earth metal oxides are given in Table 1. Some of the deficiencies or limitations of each specific example are shown.

the deficiencies introduced by components heretofore available and employed by those skilled in the art can be made by introducing those oxides by means of special fused components. Such special fused components overcome the limitations of the prior available forms of alkali metal oxides and alkaline earth metal oxides by fusing the oxides with other suitable ingredients to produce fused materials or frits that have desirable base-to-acid mole ratios, high alkali metal oxide content, suitable moisture content, rehydration rate and gas content and low levels of undesirable elements or compounds. I have chosen to call the effective ingredients that are fused with the alkali metal oxides and alkaline earth metal oxides "stabilizing compounds." The stabilizing compounds are selected from the group consisting of fluorides, silicofluorides and fluoaluminates. Other ingredients may be added and fused to produce the final welding flux component that is used to carry the alkali metal oxides and alkaline earth metal oxides into the welding flux. If the ingredients are properly selected as herein explained and if the fused component is properly prepared the component will contain a high proportion of the desirable oxides (particularly the alkali metal oxides) and an acceptable level of moisture, gases and harmful elements and compounds as appropriate for the desired application.

In describing my invention, I choose to define certain descriptive terms as follows:

Basic oxides—oxides of lithium, sodium, potassium, cesium, rubidium, magnesium, calcium, strontium and barium.

Acidic oxides—oxides of silicon and aluminum.

Neutral oxides—oxides of metals such as titanium and zirconium which are neither strongly acidic nor basic and may be used as solvent oxides in some slag systems.

Stabilizing compound—selected from the group consisting of fluorides, silicofluorides and fluoaluminates, which when fused with basic oxides will produce a product with an acceptable moisture content and rehydration rate.

Base-to-acid mole ratio—the ratio at the moles of basic oxide to the moles of acidic oxide.

TABLE 1

| Type of flux component | Nominal composition, percent by weight | Base-to-acid ratio on mole basis | Typical moisture content, percent | Typical rehydration after 24 hr. in 88% relative humidity, percent | Deficiency |
| --- | --- | --- | --- | --- | --- |
| Titanate frit | 32 $TiO_2$, 28 MnO, 20 $SiO_2$, 20 $K_2O$ | 0.64 | 0.1 | 0.3 | Low base-to-acid ratio, high $TiO_2$ and MnO contents. |
| Silicate glass frit | 75 $SiO_2$, 23 $Na_2O$, 2 other | 0.30 | | 4.2 | Low base-to-acid ratio, high $SiO_2$ content. |
| Glass powder | 74 $SiO_2$, 13 $Na_2O$ 8.5 CaO, 3.8 MgO, 0.7 other. | 0.37 | 0.025 | 0.02 | High $SiO_2$ content, low base-to-acid ratio. |
| Potassium titanate | 76.5 $TiO_2$, 22 $K_2O$, 0.5 $SiO_2$, 0.5 $ZrO_2$, 0.5 $Al_2O_3$. | 18.6 | 0.3 | 4.7 | High $TiO_2$ content. |
| Calcium zirconate | 29 CaO, 66 $ZrO_2$, 5 $SiO_2$ | 6.22 | 0.12 | 0.3 | High $ZrO_2$ content. |
| Barium zirconate | 55 BaO, 43 $ZrO_2$, 2 $SiO_2$ | 10.8 | 0.13 | 0.5 | Do. |
| Sodium carbonate | 58 $Na_2O$, 42 $CO_2$ | Basic | 0.05 | 9.0 | High gas content, high rehydration. |
| Lithium carbonate | 40.4 $Li_2O$, 59.6 $CO_2$ | Basic | 0.33 | 0.25 | High gas content. |
| Potassium carbonate | 67 $K_2O$, 23 $CO_2$ | Basic | 0.55 | 20.5 | High gas content, high rehydration. |
| Marble flour | 54 CaO, 3 $SiO_2$, 43 $CO_2$ | 19.3 | 0.08 | 0 | High gas content, low alkali oxide content. |
| Sintered magnesium oxide | 97.6 MgO, 0.75 $Fe_2O_3$ 0.65 CaO, 0.40 $SiO_2$, 0.6 other. | 405 | 0.24 | 0.23 | Low alkali oxide content. |
| Calcined dolomite | 54 CaO, 37 MgO, 6 $Fe_2O_3$ 1.0 $SiO_2$, 1.0 $Al_2O_3$ 1.0 other. | 69.6 | 0.27 | 2.07 | Do. |
| Lithium hydroxide, monohydrate | 56.5 LiOH, 43.5 $H_2O$ | Basic | 43.5 | 1.78 | High moisture content. |

The moisture and gas contents of these materials can be determined by calculation if the chemical formula of the material is known or, preferably, through test by heating and melting the material to drive off the moisture and gases which can then be selectively trapped and the percentages of the sample represented by each type calculated.

The rehydration of a material can be determined by accurately weighing a sample in particulate form of less than 40 U.S. mesh and exposing the sample to air at a known humidity level for a known period of time. A convenient combination is 24 hours at 88% relative humidity.

I have discovered that welding fluxes containing alkali metal oxides and alkaline earth metal oxides free from My welding flux component can be made by mixing the desired ingredients in a suitable crucible, such as one of graphite, and heating the mixture to a temperature sufficient to melt the mixture and drive off all gases and water. The mixture should be held in the molten state for sufficient time to allow any chemical reactions taking place to proceed to a state of completion or substantial completion. A period of about twenty minutes is usually sufficient for small experimental melts of a few hundred grams. The reaction time may depend both on the composition of the mixture and on the temperature to which the mixture is subjected. Higher temperatures will result in shorter reaction times. Other methods of manufacture such as a continuous-type furnace or an arc furnace could be used to prepare the mixture.

The ingredients are selected to produce the desired constituents in the mixture or melt after completion of the reaction. For example, $Li_2O$ can be formed by adding $Li_2CO_3$ or LiOH; $Li_3AlF_6$ can be formed by adding LiF and $AlF_3$ in proper proportions. Hydrated ingredients such as $LiOH.H_2O$ can be used provided all of the water is driven off during melting to reduce it to $Li_2O$. After melting the melt is quenched, for example, by pouring onto a steel plate. The solid fused mixture is then crushed to the desired mesh size. The welding flux component thus produced is then usually combined with conventional components to obtain the complete welding flux.

My formulas for specific fused welding flux components are based on the assumption that the reactions in the melt proceed to completion during the melting operation, but I realize that in certain instances this may not occur. Furthermore I prefer to utilize technical and commercial grade ingredients that may introduce minor amounts of impurities. Therefore the formulas for my welding flux components are meant to represent nominal compositions rather than precise compositions.

As described previously, the welding flux components manufactured in the above described manner can be formulated for use as all or part of the flux employed in submerged arc welding, as part of the coating on covered electrodes and as all or part of the flux in tubular electrodes of the flux-cored and low flux types. As is well known in the art, the total flux will be formulated to contain, as necessary or desired, slag forming materials (including the fused welding flux component), gas formers, deoxidizers and alloying elements and alloys.

My welding flux component is designed to possess certain characteristics. It should contain only very small, if any, amounts of such deleterious elements as sulfur, phosphorous, boron and hydrogen. In order to be essentially free of hydrogen the component must contain only small amounts of moisture and must not pick up harmful amounts over its useful life. Therefore the initial moisture content and the rate of moisture absorption when exposed to moist environments are important characteristics.

The specific levels of deleterious elements that can be tolerated in my welding flux component depend on the particular use to which the component is to be put. For critical applications the initial moisture content should be less than one-half percent by weight and moisture pickup should be less than one percent by weight when exposed to an atmosphere of 88% relative humidty for twenty-four hours. For less critical applications a moisture content of one percent and a moisture pickup of two to three percent can be tolerated. The amount of the component that is used in the final flux influences the amount of moisture and rehydration than can be tolerated for the component by itself. If only a small amount of the component, such as three to five percent by weight, is employed in the flux, higher levels of moisture and rehydration can be tolerated in the component than the above levels because the overall levels in the flux will still be low.

My welding flux component should have a base-to-acid mole ratio of at least 2 to 1 in order to contribute to the desired overall basicity of the flux or to counteract the presence of other acidic compounds in the flux and consists essentially of one or more stabilizing compounds plus appropriate amounts of other ingredients including basic oxide, acidic oxide and neutral oxide. If the amount of acidic oxide is too high the base-to-acid mole ratio will be too low. Preferably the base-to-acid mole ratio of the welding flux component is at least 3 to 1. If the amount of neutral oxide is too high the component will not fulfill its function of introducing significant amounts of basic alkali metal oxide and alkaline earth metal oxide into the welding flux. A welding flux component containing alkali metal oxide is preferred because alkali metal oxide is more strongly basic than alkaline earth metal oxide.

The stabilizing compounds which I employ and which I have found to have optimum and superior properties are fluorides, silicofluorides and fluoaluminates. These compounds can be used to produce stable components with low moisture content, low gas content, low rehydration rate and low content of harmful impurities. Among the numerous available fluorides I have found that manganese fluoride and aluminum fluoride are most suitable. Among the numerous available silicofluorides I have found that potassium silicofluoride, sodium silicofluoride and lithium silicofluoride are most suitable. Among the several fluoaluminates that are available I have found that sodium fluoaluminate, lithium fluoaluminate and potassium fluoaluminate are most suitable. However, other fluorides, silicofluorides and fluoaluminates may be employed.

My welding flux component desirably comprises a fused mixture consisting essentially of the following listed constituents in the specified weight percentages: about 40% to about 90% of at least one stabilizing compound selected from the group consisting of fluorides, silicofluorides and fluoaluminates and about 10% to about 60% of basic oxide. My welding flux component may also contain up to about 30% of acidic oxide and/or up to about 35% of neutral oxide, the fused mixture having a base-to-acid mole ratio of at least 2 to 1. When these additional constituents are present the percentage of stabilizing compound is appropriately adjusted.

As indicated above the welding flux can contain other components as required by the specific application and may include slag formers, fluxing agents, deoxidizers, gas formers and metals and alloys for alloying purposes. The flux may be prepared by any of the well known methods such as mixing with a binder and extruding over a metallic or tubular core to form a covered electrode or mixing with a binder to form agglomerated particles appropriate for submerged arc welding or wet or dry mixing and filling a metallic tube to form a flux-cored tubular electrode.

Optimum results are obtained by maintaining the composition of the welding flux component within my specified limits. If the base-to-acid ratio of the component is too low the component will not contribute the desirable level of basic compounds to the flux. If the basic oxide is too high or the stabilizing compound is outside the specified range the component will tend to be excessively hygroscopic and may not remain in a stable form resulting in the production of an inferior welding flux. Furthermore, if the level of neutral oxide becomes too high the component will limit flux formulation by introducing too high a level of undesired substance.

My welding flux component may contain about 55% to about 90% of at least one stabilizing compound selected from the group consisting of manganese fluoride and aluminum fluoride and about 10% to about 45% of at least one basic oxide selected from the group consisting of lithium oxide, sodium oxide, potassium oxide and alkaline earth metal oxide. Of the fused mixture constituting the welding flux component up to about 15% of lithium oxide, up to about 30% of sodium oxide, up to about 30% of potassium oxide and up to about 25% of alkaline earth metal oxide can be utilized. My welding flux component may also contain up to about 30% of acidic oxide and/or up to about 30% of neutral oxide and/or up to about 65% of at least one silicofluoride selected from the group consisting of potassium silicofluoride, sodium silicofluoride and lithium silicofluoride. When these additional ingredients are used the percentage of stabilizer is appropriately adjusted. As above stated the preferred components have a base-to-acid mole ratio of at least 3 to 1.

I further provide other preferred welding flux components as described above in which at least one stabilizing compound is selected from the group consisting of sodium fluoaluminate, potassium fluoaluminate and lithium fluoaluminate or from the group consisting of sodium silicofluoride, potassium silicofluoride and lithium silicfluoride.

Examples of welding flux components formulated according to my invention are listed in Table 2. Rehydration data for these components are also given in the table. Based on the rehydration data the usefulness of the components can be classified on the basis of the criticality of the application of the welding flux:

| Criticality of application of welding flux | Useful component numbers for flux | Example |
| --- | --- | --- |
| High | 8, 10, 13 | Welding ultrahigh strength steels. |
| Moderate | 2, 6, 7, 9, 15 | Welding low-alloy steels. |
| Low | 1, 3, 11, 14 | Welding medium-carbon steels. |
| Very Low | 4, 5, 12 | Welding mild steel. |

TABLE 2

| Welding flux component number | Base-to-acid mole ratio [1] | Composition, weight percent | | | | | Rehydration,[2] weight percent |
| --- | --- | --- | --- | --- | --- | --- | --- |
| | | $Li_2O$ | $K_2O$ | $Na_2O$ | CaO | Other | |
| 1 | 3.0 | 4 | 15 | 9.5 | | 24 $TiO_2$, 9 $SiO_2$, 38.5 $Na_3AlF_6$ | 0.54 |
| 2 | Basic | 4 | 15 | 9 | | 73 $Li_3AlF_6$ | 0.47 |
| 3 | Basic | 6 | 23 | | | 71 $Li_3AlF_6$ | 0.67 |
| 4 | 2.4 | | 27 | 17 | | 10 $CaF_2$, 14 $AlF_3$, 18 $TiO_2$ 14 $SiO_2$ | 3.3 |
| 5 | Basic | | 13 | 8 | | 79 $Na_3AlF_6$ | 2.2 |
| 6 | Basic | | 13 | 8 | | 59 $Na_3AlF_6$, 20 $K_2SiF_6$ | 0.41 |
| 7 | Basic | 7.5 | | 18.5 | | 37 $Na_3AlF_6$, 37 $Na_2SiF_6$ | 0.33 |
| 8 | Basic | 7.5 | | 18.5 | | 37 $AlF_3$, 37 $Na_2SiF_6$ | 0.23 |
| 9 | Basic | 13.5 | | 27.5 | | 17 $MnF_2$, 42 $Na_2SiF_6$ | 0.42 |
| 10 | Basic | 11.5 | | | 8.5 | 57 $Na_2SiF_6$, 23 $MnF_2$ | 0.053 |
| 11 | Basic | | | | 24 | 24 $MnF_2$, 52 $Na_2SiF_6$ | 1.31 |
| 12 | 1.9 | 4.5 | 18 | 11 | | 28.5 $K_2SiF_6$, 21.5 $TiO_2$, 16.5 $SiO_2$ | 3.2 |
| 13 | Basic | 7.5 | | 18.5 | | 37 $MnF_2$, 37 $K_2SiF_6$ | 0.18 |
| 14 | Basic | | 13.5 | 8 | | 66 $Li_3AlF_6$, 12.5 MnO | 0.61 |
| 15 | Basic | | | 8.5 | 6.5 | 65.5 $Na_3AlF_6$, 19.5 $K_2SiF_6$ | 0.39 |

[1] Basic indicates that no acidic oxides are present.
[2] Weight gain after 24 hrs. in 88% relative humidity.

Examples of welding fluxes formulated using fused components according to my invention are listed in Table 3. These fluxes are prepared and utilized with the well-known procedures for each particular type.

TABLE 3

| Welding flux | Use of flux | Composition of flux, weight percent | | | | | | |
| --- | --- | --- | --- | --- | --- | --- | --- | --- |
| | | Fused component [1] | Gas formers | Fluxing agents | Slag formers | Deoxidizers | Metals and alloys | Other | Comment |
| I | Covered electrode for hard surfacing. | 1.5 | 3.0 | 2.5 | | | 92.0 | 1 | Binder at 10 cc./100 g. |
| II | Agglomerated flux for submerged arc. | 10.0 | | 20.0 | 65.0 | 3.0 | 2.0 | | Do. |
| III | Flux for tubular electrode. | 10.0 | | | 50.0 | 30.0 | 10.0 | | |

[1] Components as follows:
Flux I = Component No. 9.
Flux II = Component No. 10.
Flux III = Component No. 2.

While I have described certain preferred embodiments of the invention it is to be distinctly understood that the invention is not limited thereto but may be otherwise variously embodied within the scope of the following claims.

I claim:

1. A welding flux component comprising a fused mixture consisting essentially of the following listed constituents in the specified weight percentages: about 40% to about 90% of at least one stabilizing compound selected from the group consisting of fluorides, silicofluorides and fluoaluminates and about 10% to about 60% of basic oxide.

2. A welding flux component comprising a fused mixture consisting essentially of the following listed constituents in the specified weight percentages: about 10% to about 90% of at least one stabilizing compound selected from the group consisting of fluorides, silicofluorides and fluoaluminates, about 10% to about 60% of basic oxide and up to about 30% of acidic oxides, the fused mixture having a base-to-acid mole ratio of at least 2 to 1.

3. A welding flux component comprising a fused mixture consisting essentially of the following listed constituents in the specified weight percentages: about 10% to about 90% of at least one stabilizing compound selected from the group consisting of fluorides, silicofluorides and fluoaluminates, about 10% to about 60% of basic oxide and up to about 35% of neutral oxide.

4. A welding flux component comprising a fused mixture consisting essentially of the following listed constituents in the specified weight percentages: about 10% to about 90% of at least one stabilizing compound selected from the group consisting of fluorides, silicofluorides and fluoaluminates, about 10% to about 60% of basic oxide, up to about 30% of acidic oxide and up to about 35% of neutral oxide, the fused mixture having a base-to-acid mole ratio of at least 2 to 1.

5. A welding flux component comprising a fused mixture consisting essentially of the following listed constituents in the specified weight percentages: about 55% to about 90% of at least one stabilizing compound selected from the group consisting of manganese fluoride and aluminum fluoride and about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture.

6. A welding flux component comprising a fused mixture consisting essentially of the following listed constituents in the specified weight percentages: about 25% to about 85% of at least one stabilizing compound selected from the group consisting of manganese fluoride and aluminum fluoride, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture and up to about 30% of neutral oxide.

7. A welding flux component comprising a fused mixture consisting essentially of the following listed constituents in the specified weight percentages: about 25% to about 85% of at least one stabilizing compound selected from the group consisting of manganese fluoride and aluminum fluoride, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture and up to about 30% of acidic oxide, the fused mixture having a base-to-acid mole ratio of at least 3 to 1.

8. A welding flux component comprising a fused mixture consisting essentially of the following listed constituents in the specified weight percentages: about 10% to about 85% of at least one stabilizing compound selected from the group consisting of manganese fluoride and aluminum fluoride, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture, up to about 30% neutral oxide and up to about 30% of acidic oxide, the fused mixture having a base-to-acid mole ratio of at least 3 to 1.

9. A welding flux component comprising a fused mixture consisting essentially of the following listed constituents in the specified weight percentages: about 10% to about 85% of at least one stabilizing compound selected from the group consisting of manganese fluoride and aluminum fluoride, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture and up to about 65% of at least one silicofluoride selected from the group consisting of potassium silicofluoride, sodium silicofluoride and lithium silicofluoride.

10. A welding flux component comprising a fused mixture consisting essentially of the following listed constituents in the specified weight percentages: about 10% to about 85% of at least one stabilizing compound selected from the group consisting of manganese fluoride and aluminum fluoride, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture, up to about 30% of neutral oxide and up to about 65% of at least one silicofluoride selected from the group consisting of potassium silicofluoride, sodium silicofluoride and lithium silicofluoride.

11. A welding flux component comprising a fused mixture consisting essentially of the following listed constituents in the specified weight percentages: about 10% to about 85% of at least one stabilizing compound selected from the group consisting of manganese fluoride and aluminum fluoride, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture, up to about 30% of acidic oxide and up to about 65% of at least one silicofluoride selected from the group consisting of potassium silicofluoride, sodium silicofluoride and lithium silicofluoride, the fused mixture having a base-to-acid mole ratio of at least 3 to 1.

12. A welding flux component comprising a fused mixture consisting essentially of the following listed constituents in the specified weight percentages: about 10% to about 85% of at least one stabilizing compound selected from the group consisting of manganese fluoride and aluminum fluoride, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture, up to about 30% neutral oxide, up to about 30% of acidic oxide and up to about 65% of at least one silicofluoride selected from the group consisting of potassium silicofluoride, sodium silicofluoride and lithium silicofluoride, the fused mixture having a base-to-acid mole ratio of at least 3 to 1.

13. A welding flux component comprising a fused mixture consisting essentially of the following listed constituents in the specified weight percentages: about 55% to about 90% of at least one stabilizing compound selected from the group consisting of sodium fluoaluminate, potassium fluoaluminate and lithium fluoaluminate and about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture.

14. A welding flux component comprising a fused mixture consisting essentially of the following listed constituents in the specified weight percentages: about 25% to about 85% of at least one stabilizing compound selected from the group consisting of sodium fluoaluminate, potassium fluoaluminate and lithium fluoaluminate, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture and up to about 30% of neutral oxide.

15. A welding flux component comprising a fused mixture consisting essentially of the following listed constituents in the specified weight percentages: about 25% to about 85% of at least one stabilizing compound selected from the group consisting of sodium fluoaluminate, potassium fluoaluminate and lithium fluoaluminate, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture and up to about 30% of acidic oxide, the fused mixture having a base-to-acid mole ratio of at least 3 to 1.

16. A welding flux component comprising a fused mixture consisting essentially of the following listed constituents in the specified weight percentages: about 10% to about 85% of at least one stabilizing compound selected from the group consisting of sodium fluoaluminate, potassium fluoaluminate and lithium fluoaluminate, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture, up to about 30% of neutral oxide and up to about 30% of acidic oxide, the fused mixture having a base-to-acid mole ratio of at least 3 to 1.

17. A welding flux component comprising a fused mixture consisting essentially of the following listed constituents in the specified weight percentages: about 20% to about 85% of at least one stabilizing compound selected from the group consisting of sodium fluoaluminate, lithium fluoaluminate and potassium fluoaluminate, about 15% to about 45% of at least one silicofluoride selected from the group consisting of sodium silicofluoride, potassium silicofluoride and lithium silicofluoride and about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture.

18. A welding flux component comprising a fused mixture consisting essentially of the following listed constituents in the specified weight percentages: about 20% to about 85% of at least one stabilizing compound selected from the group consisting of sodium fluoaluminate, lithium fluoaluminate and potassium fluoaluminate, about 15% to about 45% of at least one silicofluoride selected from the group consisting of sodium silicofluoride, potassium silicofluoride and lithium silicofluoride, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture and up to about 30% of acidic oxide, the fused mixture having a base-to-acid mole ratio of at least 3 to 1.

19. A welding flux component comprising a fused mixture consisting essentially of the following listed constituents in the specified weight percentages: about 20% to about 85% of at least one stabilizing compound selected from the group consisting of sodium fluoaluminate, lithium fluoaluminate and potassium fluoaluminate, about 15% to about 45% of at least one silicofluoride selected from the group consisting of sodium silicofluoride, potassium silicofluoride and lithium silicofluoride, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and the alkaline earth metal oxide present up to about 25% of the fused mixture and up to about 30% of neutral oxide.

20. A welding flux component comprising a fused mixture consisting essentially of the following listed constituents in the specified weight percentages: about 20% to about 85% of at least one stabilizing compound selected from the group consisting of sodium fluoaluminate, lithium fluoaluminate and potassium fluoaluminate, about 15% to about 45% of at least one silicofluoride selected from the group consisting of sodium silicofluoride, potassium silicofluoride and lithium silicofluoride, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture, up to about 30% of acidic oxide and up to about 30% of neutral oxide, the fused mixture having a base-to-acid mole ratio of at least 3 to 1.

21. A welding flux component comprising a fused mixture consisting essentially of the following listed constituents in the specified weight percentages: about 55% to about 90% of at least one stabilizing compound selected from the group consisting of potassium silicofluoride, sodium silicofluoride and lithium silicofluoride and about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture.

22. A welding flux component comprising a fused mixture consisting essentially of the following listed constituents in the specified weight percentages: about 25% to about 85% of at least one stabilizing compound selected from the group consisting of potassium silicofluoride, sodium silicofluoride and lithium silicofluoride, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture and up to about 30% of neutral oxide.

23. A welding flux component comprising a fused mixture consisting essentially of the following listed constituents in the specified weight percentages: about 25% to about 85% of at least one stabilizing compound selected from the group consisting of potassium silicofluoride, sodium silicofluoride and lithium silicofluoride, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture and up to about 30% of acidic oxide, the fused mixture having a base-to-acid mole ratio of at least 3 to 1.

24. A welding flux component comprising a fused mixture consisting essentially of the following listed constituents in the specified weight percentages: about 10% to about 85% of at least one stabilizing compound selected from the group consisting of potassium silicofluoride, sodium silicofluoride and lithium silicofluoride, about 10% to about 45% of at least one basic oxide selected from the group consisting of lithium oxide present up to about 15% of the fused mixture, sodium oxide present up to about 30% of the fused mixture, potassium oxide present up to about 30% of the fused mixture and alkaline earth metal oxide present up to about 25% of the fused mixture, up to about 30% of neutral oxide and up to about 30% of acidic oxide, the fused mixture having a base-to-acid mole ratio of at least 3 to 1.

References Cited

UNITED STATES PATENTS

| | | | |
|---|---|---|---|
| 2,507,751 | 5/1950 | Bennett | 148—26 |
| 2,785,094 | 3/1957 | Garriott | 117—206 |
| 3,068,128 | 12/1962 | Shrubsall et al. | 148—26 |
| 3,340,104 | 9/1967 | Ballass et al. | 148—26 |
| 3,340,105 | 9/1967 | Ballass et al. | 148—26 |
| 3,340,106 | 9/1967 | Ballass et al. | 148—26 |
| 3,340,107 | 9/1967 | Ballass et al. | 148—26 |
| 3,424,626 | 1/1969 | Coless et al. | 148—26 |

FOREIGN PATENTS

| | | | |
|---|---|---|---|
| 538,928 | 4/1957 | Canada | 148—26 |

L. DEWAYNE RUTLEDGE, Primary Examiner

W. W. STALLARD, Assistant Examiner

UNITED STATES PATENT OFFICE
CERTIFICATE OF CORRECTION

Patent No. 3,580,748　　　　　　　　　Dated May 25, 1971

Inventor(s) WILLIAM T. DELONG

It is certified that error appears in the above-identified patent and that said Letters Patent are hereby corrected as shown below:

In the heading to the printed specification, line 4, "assignor to The McKay Company, Pittsburgh, Pa." should read --assignor, by mesne assignments, to Teledyne, Inc., Los Angeles, California, a corporation of Delaware--. Column 2, line 3, "thhe" should be --the--. Column 4, line 67, after "for" insert --a--. Column 7, line 2, "silic-" should be --silico- --. Column 11, line 41, before "alkaline" cancel --the--.

Signed and sealed this 26th day of October 1971.

(SEAL)
Attest:

EDWARD M. FLETCHER, JR.　　　　　　　ROBERT GOTTSCHALK
Attesting Officer　　　　　　　　　　Acting Commissioner of Patents

Disclaimer 3,580,748.—*William T. Delong*, Manchester Township, York County, Pa. WELDING FLUX COMPONENT. Patent dated May 25, 1971. Disclaimer filed June 1, 1976, by the assignee, *Teledyne, Inc.*
Hereby enters this disclaimer to claim 4 of said patent.
[*Official Gazette July 27, 1976.*]

Disclaimer and Dedication 3,580,748.—*William T. Delong*, Manchester Township, York County, Pa. WELDING FLUX COMPONENT. Patent dated May 25, 1971. Disclaimer and dedication filed Sept. 12, 1977, by the assignee, *Teledyne, Inc.*

Hereby disclaims and dedicates to the Public all claims of said patent.

[*Official Gazette November 15, 1977.*]